(12) United States Patent
Hong

(10) Patent No.: US 8,238,447 B2
(45) Date of Patent: *Aug. 7, 2012

(54) METHOD OF REMOVING A BLOCKING PHENOMENON

(75) Inventor: Min Cheol Hong, Seoul (KR)

(73) Assignee: LG Electronics. Inc., Seoul (KR)

( * ) Notice: Subject to any disclaimer, the term of this patent is extended or adjusted under 35 U.S.C. 154(b) by 1247 days.

This patent is subject to a terminal disclaimer.

(21) Appl. No.: 11/905,543

(22) Filed: Oct. 2, 2007

(65) Prior Publication Data

US 2008/0117989 A1    May 22, 2008

Related U.S. Application Data

(62) Division of application No. 11/097,394, filed on Apr. 5, 2005, now Pat. No. 7,711,054, which is a division of application No. 10/170,999, filed on Jun. 14, 2002, now Pat. No. 7,272,186.

(30) Foreign Application Priority Data

Jun. 15, 2001    (KR) .................. 10-2001-0033953

(51) Int. Cl.
*H04N 7/12* (2006.01)

(52) U.S. Cl. ................................. 375/240.29

(58) Field of Classification Search ............... 375/240.29
See application file for complete search history.

(56) References Cited

U.S. PATENT DOCUMENTS

| 5,283,646 | A | 2/1994 | Bruder |
| 5,488,570 | A | 1/1996 | Agarwal |
| 5,563,813 | A | 10/1996 | Chen et al. |
| 5,610,729 | A | 3/1997 | Nakajima |
| 5,611,000 | A | 3/1997 | Szeliski et al. |
| 5,748,795 | A | 5/1998 | Ohnishi et al. |
| 5,790,131 | A | 8/1998 | Liang et al. |

(Continued)

FOREIGN PATENT DOCUMENTS

KR    10-0230277    8/1999

(Continued)

OTHER PUBLICATIONS

ITU-T Q.15/SG16, "H.26L Test Model Long Term Number 5 (TML-5) draft0," Oct. 2000, Doc. Q15-K-59, pp. 13-32.*

(Continued)

*Primary Examiner* — David Czekaj
*Assistant Examiner* — Anner Holder
(74) *Attorney, Agent, or Firm* — Harness, Dickey & Pierce, P.L.C.

(57) ABSTRACT

One embodiment of the method includes obtaining a coded block pattern of first and second blocks. The coded block pattern is one of a plurality of coded block patterns, the plurality of coded block patterns includes an intra-coded block, and the second block is adjacent to the first block. Whether the first block has non-zero transform coefficient information is determined if the obtained coded block pattern of the first block is not the intra-coded block. A motion vector difference between a motion vector for the first block and a motion vector for the second block is obtained. A non-zero filter strength value is determined based on the obtained coded block pattern of the first and second block, the determination of whether the first block has non-zero transform coefficient information, and the obtained motion vector difference. The blocking phenomenon is removed according to the filter strength.

2 Claims, 3 Drawing Sheets

U.S. PATENT DOCUMENTS

| | | | |
|---|---|---|---|
| 5,878,166 | A | 3/1999 | Legall |
| 5,940,536 | A | 8/1999 | Wake et al. |
| 5,982,442 | A | 11/1999 | Guntzburger |
| 5,982,447 | A | 11/1999 | Nakamura |
| 6,041,145 | A | 3/2000 | Hayashi et al. |
| 6,058,210 | A | 5/2000 | de Queiroz et al. |
| 6,108,455 | A | 8/2000 | Mancuso |
| 6,167,164 | A | 12/2000 | Lee |
| 6,178,205 | B1 | 1/2001 | Cheung et al. |
| 6,184,936 | B1 | 2/2001 | Hu |
| 6,195,632 | B1 | 2/2001 | Pearson |
| 6,226,050 | B1 | 5/2001 | Lee |
| 6,259,823 | B1 | 7/2001 | Lee et al. |
| 6,385,245 | B1 | 5/2002 | De Haan et al. |
| 6,434,275 | B1 | 8/2002 | Fukuda et al. |
| 6,529,638 | B1 | 3/2003 | Westerman |
| 6,535,643 | B1 | 3/2003 | Hong |
| 6,539,060 | B1 | 3/2003 | Lee et al. |
| 6,594,400 | B1 | 7/2003 | Kim |
| 6,611,361 | B1 | 8/2003 | Hong |
| 6,631,162 | B1 | 10/2003 | Lee |
| 6,665,346 | B1 | 12/2003 | Lee et al. |
| 6,731,818 | B1 | 5/2004 | Conklin |
| 7,050,504 | B2 | 5/2006 | Joch et al. |
| 7,251,276 | B2 | 7/2007 | Lee et al. |
| 7,397,853 | B2 | 7/2008 | Kwon et al. |
| 7,450,641 | B2 | 11/2008 | Sun et al. |
| 2005/0147319 | A1 | 7/2005 | Deshpande et al. |
| 2005/0201633 | A1 | 9/2005 | Moon et al. |
| 2008/0056352 | A1 | 3/2008 | Kim et al. |
| 2008/0056602 | A1 | 3/2008 | Xue et al. |
| 2008/0192832 | A1 | 8/2008 | Kim et al. |

FOREIGN PATENT DOCUMENTS

| | | |
|---|---|---|
| KR | 10-2000-0031028 | 6/2000 |
| WO | WO 9904497 A2 | 1/1999 |

OTHER PUBLICATIONS

United States Office Action dated Jan. 15, 2010 for corresponding U.S. Appl. No. 11/097,394.

United States Office Action dated Jan. 15, 2010 for corresponding U.S. Appl. No. 11/097,312.

United States Office Action dated Jan. 15, 2010 for corresponding U.S. Appl. No. 11/097,393.

Pang, Khee K. et al. "Optimum Loop Filter in Hybrid Coders." IEEE Circuits and Systems for Video Technology, vol. 4, No. 2, Apr. 1994, pp. 158-167.

Korean Office Action dated Jul. 18, 2005.

Translation of Korean Office Action dated Jul. 18, 2005.

Yang et al. "Iterative Projection Algorithms for Removing the Blocking Artifacts of Bock-DCT Compressed Images." IEEE 1993, pp. V405-V408.

Zakhor. "Iterative Procedures for Reduction of Blocking Effects in Transform Image Coding." IEEE Transactions on Circuits and Systems for Video Technology, vol. 2, No. 1, IEEE Mar. 1993, pp. 91-95.

ITU-T Recommendation H. 263, "Video Coding for Low Bit Rate Communication," ITU-T Telecommunication Standardization Sector of ITU, Series H: Audiovisual and Multimedia Systems Infrastructure of Audiovisual Services—Coding of Moving Video, International Telecommunication Union, 1998.

"Information Technology—Generic Coding of Audio-Visual Objects," ISO-IEC 14496-2, Final Draft of International Standard, Switzerland, Dec. 18, 1998, 14:48.

Office Action for corresponding U.S. Appl. No. 11/905,658 dated Sep. 29, 2011.

Office Action for corresponding U.S. Appl. No. 11/905,661 dated Oct. 6, 2011.

Office Action for corresponding U.S. Appl. No. 11/905,666 dated Oct. 14, 2011.

* cited by examiner

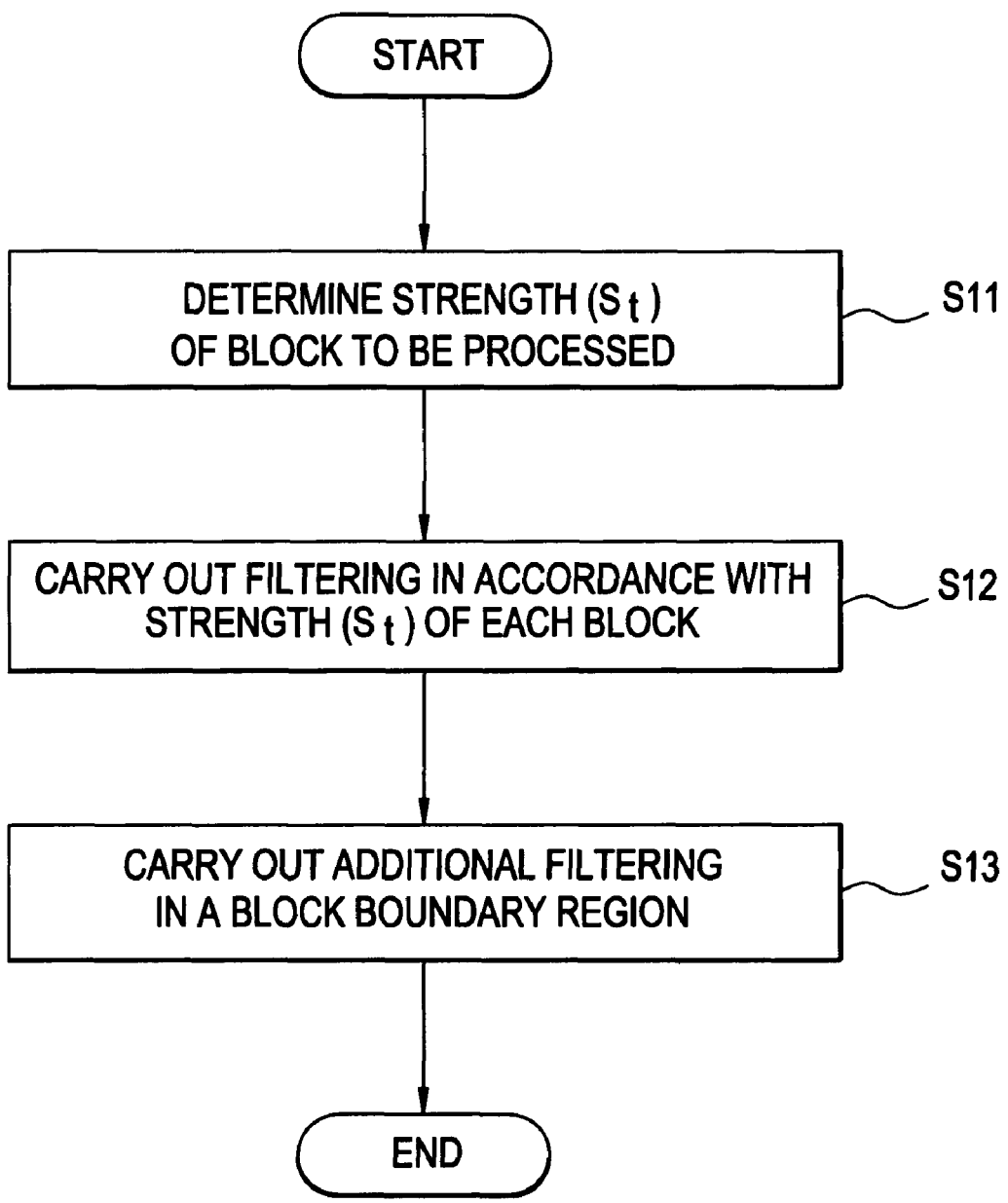

FIG. 4

| QP | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LQP | 620 | 553 | 492 | 439 | 391 | 348 | 310 | 276 | 246 | 219 | 195 | 174 | 155 | 138 | 123 | 110 |

| QP | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| LQP | 98 | 87 | 77 | 66 | 62 | 61 | 56 | 50 | 46 | 40 | 36 | 33 | 30 | 27 | 24 | 22 |

METHOD OF REMOVING A BLOCKING PHENOMENON

DOMESTIC PRIORITY INFORMATION

This is a divisional of U.S. application Ser. No. 11/097,394 filed Apr. 5, 2005 now U.S. Pat. No. 7,711,054, which is a divisional of U.S. application Ser. No. 10/170,999 filed Jun. 14, 2002, now issued as U.S. Pat. No. 7,272,186; the contents of all of which are hereby incorporated by reference in their entirety.

FOREIGN PRIORITY INFORMATION

The present invention claims priority under 35 U.S.C. 119 on Korean Application No. 2001-33953 filed Jun. 15, 2001; the contents of which are hereby incorporated by reference in their entirety.

BACKGROUND OF THE INVENTION

1. Field of the Invention

The present invention relates to a moving picture compression technique, and more particularly, to a loop filtering method in a video coder.

2. Description of the Background Art

Generally, it has been proved that the "H.26L" system developed as a next generation moving picture compression technique is superior to the "H.263" and "MPEG4" systems in performance.

The "H.26L" system as the next generation moving picture compression system differs from the conventional H.263 and MPEG4 in using 4×4 block based transformation & encoding, carrying out motion estimation & compensation of a transformation block size, and using a single variable length coder (VLC).

Superior to the conventional motion picture standards in aspect of performance, the H.26L system has excessive calculation of encoder as well as uses 4×4 block based transformation so that a blocking dominates than the conventional standards.

In order to remove the blocking, filters include a loop filtering system inside the encoder and decoder, a post filter processed in a next stage of the decoder, and a system adding the loop filtering system to the post filter.

When the blocking is removed by the loop filtering system in general, a difference between an input video and a motion video is affected so that an encoding rate increases in a specific case. Yet, as the loop filtering system is installed inside a video coder, complexity of the encoder increases.

As mentioned in the above explanation, the H.26L system according to the related art requires excessive quantity of calculation despite the superiority in performance to the moving picture standards as well as having the blocking more dominant than that of the moving picture standards due to the 4×4 block based transformation system.

Moreover, if the blocking is removed by the loop filtering system according to the related art, the difference between the input video and the motion video is affected so as to increase the encoding rate in a specific case. Yet, the loop filtering system built inside the video coder increases the complexity of the encoder.

SUMMARY OF THE INVENTION

The present invention relates to a method of removing a blocking phenomenon.

One embodiment of the method includes obtaining a coded block pattern of first and second blocks. The coded block pattern is one of a plurality of coded block patterns, the plurality of coded block patterns includes an intra-coded block, and the second block is adjacent to the first block. Whether the first block has non-zero transform coefficient information is determined if the obtained coded block pattern of the first block is not the intra-coded block. A motion vector difference between a motion vector for the first block and a motion vector for the second block is obtained. A non-zero filter strength value is determined based on the obtained coded block pattern of the first and second block, the determination of whether the first block has non-zero transform coefficient information, and the obtained motion vector difference. The blocking phenomenon is removed according to the filter strength.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a flowchart of a loop filtering process according to an embodiment of the present invention;

FIG. 4 illustrates a table of LQP values for determining DQP(QP) values according to an embodiment of the present invention.

DETAILED DESCRIPTION OF THE EXAMPLE EMBODIMENTS

Figure 2A:
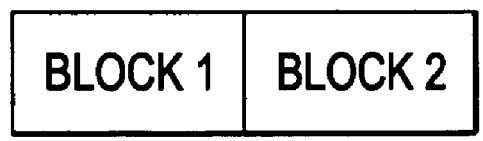
FIGS. 2A and 2B illustrate block diagrams indicating block locations in horizontal and vertical directions according to an embodiment of the present invention, respectively.

Reference will now be made in detail to the example embodiments of the present invention, which are illustrated in the accompanying drawings.

Hereinafter, a loop filtering method in a video coder according to an example embodiment of the present invention carries out a real-time processing of removing a blocking and a ringing phenomenon in accordance with a pixel location, a coded block pattern, a quantization step size, and a motion vector size in a digital video appliance using the H.26L moving picture compression technique, thereby enabling to improve a video quality of a compression image demanding a low bit rate or high-speed processing.

First, explained in detail is a real-time processing technique of removing "blocking" and "ringing" by predicting an original video for correlation between pixels in accordance with a quantization variable QP, a coded block pattern, and a motion vector size available for a decoder (not shown in the drawing).

When an original video f is transmitted as a compressed form, a video restructured in a decoder can be expressed by the following Formula 1-1.

$$g = f + n,$$ [Formula 1-1]

where g, f, and n are a compression video rearranged in a scanning order, an original video, and a column vector of quantization error, respectively.

A relation between respective pixels can be expressed by the following Formula 1-2 in order to process the Formula 1-1 by pixel unit.

$$g(i,j)=f(i,j)+n(i,j), \quad \text{[Formula 1-2]}$$

where i and j indicate a location of a pixel in vertical and horizontal directions.

An additional function can be defined as the following Formula 1-3 when reliability of original pixels and 1-dimensional smoothing function for each pixel are used together with a regularization. Firstly, a horizontal direction is considered.

$$M\{f(i,j)\}=M_P\{f(i,j)\}+M_N\{f(i,j)\}, \quad \text{[Formula 1-3]}$$

where $M_P$ and $M_N$ are functions representing reliability smoothing degrees of left and right directions for a pixel f(i,j), respectively.

And, such functions are defined as the following Formula 1-4, where the $M_P$ and $M_N$ are the functions considering f(i,j) & f(i,j−1) and f(i,j) & f(i,j+1), respectively.

$$M_P\{f(i,j)\}=\alpha_P\{f(i,j)-f(i,j-1)\}^2+(1-\alpha_P)\{g(i,j)-f(i,j)\}^2$$

$$M_N\{f(i,j)\}=\alpha_N\{f(i,j)-f(i,j-1)\}^2+(1-\alpha_N)\{g(i,j)-f(i,j)\}^2 \quad \text{[Formula 1-4]}$$

Each of the first terms of right sides in Formula 1-4 indicates irregularity with an adjacent pixel, i.e. a difference from an adjacent pixel, for the pixel f(i,j), and each of the second terms indicates a reliability for the original pixel f(i,j). Moreover, $\alpha_P$ and $\alpha_N$ mean regularization parameters representing ratios between irregular and reliability terms defined in the functions, respectively. And, $\alpha_P$ and $\alpha_N$ are parameters adjusting a relative coherence between the two terms in Formula 1-4.

With the above manner, the additional function is defined for each pixel of the moving picture, and the function in a vertical direction is defined by varying the parameter i instead of the parameter j in Formula 1-4.

Thereafter, if a differential is applied to the additional functions in Formula 1-4 defined for each pixel of the moving picture in order to find a restored video from which the blocking and ringing are removed, the following Formulas 1-5 and 1-6 are attained.

$$\frac{\partial M\{f(i,j)\}}{\partial f(i,j)} = \frac{\partial M_P\{f(i,j)\}}{\partial f(i,j)} + \frac{\partial M_N\{f(i,j)\}}{\partial f(i,j)} = 0 \quad \text{[Formula 1-5]}$$

From Formula 1-5, the following Formula 1-6 is found.

$$\frac{\partial M_P\{f(i,j)\}}{\partial f(i,j)} = \quad \text{[Formula 1-6]}$$
$$2\partial_P\{f(i,j)-f(i,j-1)\}-2(1-\alpha_P)\{g(i,j)-f(i,j)\}$$
$$\frac{\partial M_N\{f(i,j)\}}{\partial f(i,j)} =$$
$$2\partial_N\{f(i,j)-f(i,j-1)\}-2(1-\alpha_N)\{g(i,j)-f(i,j)\}$$

From Formulas 1-5 and 1-6, the pixel to be restored in a horizontal direction can be found by the following Formula 1-7.

$$f(i,j) = \frac{(2-\alpha_P-\alpha_N)g(i,j)+\alpha_P f(i,j-1)+\alpha_N f(i,j+1)}{2} \quad \text{[Formula 1-7]}$$

As the regularization parameters in Formula 1-7 are between "0" and "1", Formula 1-7 can be defined by the following Formula 1-8.

$$f(i,j) = \frac{(2-\alpha_P-\alpha_N)g(i,j)+\alpha_P g(i,j-1)+\alpha_N g(i,j+1)}{2} \quad \text{[Formula 1-8]}$$

Looking into Formula 1-8, a blocking-removed video of the compression video is determined by the two, left and right pixel values and the regularization parameters by taking the $i_{th}$ and $j_{th}$ videos as references.

As the two, left and right pixel values can be used for encoding and decoding, two regularization parameter values are set up for attaining the restored video. For this, "set theoretic" is applied to the restoration by pixel unit so as to represent regularization coefficients by the following Formula 1-9, where "set theoretic" is a theory for controlling the parameters $\alpha_P$ and $\alpha_N$ in Formula 1-4.

$$\frac{\alpha_P}{1-\alpha_P} = \quad \text{[Formula 1-9]}$$
$$\frac{\{f(i,j)-g(i,j)\}^2}{\{f(i,j)-f(i,j-1)\}^2} \approx \frac{K_P QP^2}{\{g(i,j)-g(i,j-1)\}^2},$$
$$\frac{\alpha_N}{1-\alpha_N} = \frac{\{f(i,j)-g(i,j)\}^2}{\{f(i,j)-f(i,j+1)\}^2} \approx \frac{K_N QP^2}{\{g(i,j)-g(i,j+1)\}^2}$$

$K_P$ and $K_N$ in Formula 1-9 are determined statistically as adaptive parameters depending on a location of a pixel since the irregularities between pixels at a block boundary and an inner block side are different from each other. And, "QP" is a quantization parameter of a macro block to which the pixel f(i,j) belongs.

Even though the restored video from which blocking is removed using Formulas 1-8 and 1-9, the value of the regularization parameter requires a floating-point operation so as to become a problem in aspect of calculation quantity of the filter to remove the "blocking".

Therefore, Formulas 1-8 and 1-9 are transformed into the following Formulas 1-10 and 1-11 for integer operation.

$$f(i,j) = \frac{(2^9-\alpha_P\times 2^8-\alpha_N\times 2^8)g(i,j)+\alpha_P 2^8\times g(i,j-1)+\alpha_N\times 2^8\times g(i,j+1)}{2\times 2^8} \quad \text{[Formula 1-10]}$$

$$\beta_P = \alpha_P\times 2^8 = \frac{2^8\times K_P QP^2}{K_P QP^2+\{g(i,j)-g(i,j-1)\}^2}, \quad \text{[Formula 1-11]}$$
$$\beta_N = \alpha_N\times 2^8 = \frac{2^8\times K_N QP^2}{k_N QP^2+\{g(i,j)-g(i,j-1)\}^2}$$

In this case, $\beta_P$ and $\beta_N$, as defined in Formula 1-11, are variables attained by multiplying $\alpha_P$ and $\alpha_N$ by $2^8$, respectively. Namely, $\beta_P$ and $\beta_N$ are parameters for making $\alpha_P$ and $\alpha_N$ into integers.

In an algorithm according to the present invention, the regularization parameters as integer forms using Formula 1-11 are generated, and then stored as a look-up table form to be used.

Hence, Formula 1-10 for blocking filtering can be found by knowing the pixel f(i,j) and locations and quantization parameter values of two pixels adjacent to the pixel f(i,j).

Meanwhile, in the loop filtering process of the present invention, a video of which blocking in a direction of a horizontal axis is removed by loop-filtering a block of a moving picture is attained, and then the video is loop-filtered in a direction of a vertical axis so as to provide the video of which blocking in a direction of a vertical axis is removed.

FIG. 1 illustrates a flowchart of a loop filtering process according to an embodiment of the present invention.

Referring to FIG. 1, a loop filtering method according to an embodiment of the present invention includes the steps of determining a strength of a block to be processed in accordance with a coded pattern and a quantization step size of each 4×4 block when a block of a moving picture is loop-filtered in directions of its horizontal and vertical axes (S11), carrying out a loop filtering in accordance with the determined strength of the corresponding block (S12), and carrying out an additional loop filtering at a boundary region of a macro block since a relatively big blocking exists at the boundary region of the macro block (S13). This is explained in detail by referring to FIG. 2A, FIG. 2B, and FIG. 3.

Figure 2B:
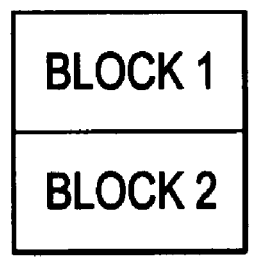
Figure 3:
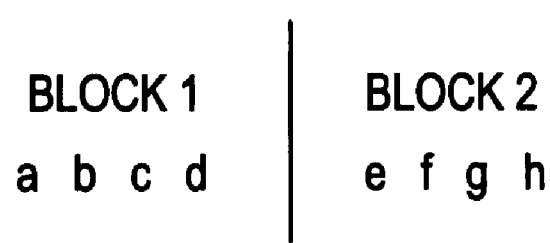
FIG. 3 illustrates a diagram of pixel locations of adjacent blocks according to an embodiment of the present invention.

FIGS. 2A and 2B illustrate block diagrams indicating block locations in horizontal and vertical directions according to an embodiment of the present invention, respectively, and FIG. 3 illustrates a diagram of pixel locations of adjacent blocks according to an embodiment of the present invention, in which block locations in directions of horizontal and vertical axes are shown.

First of all, the step of determining the block strength St and a filtering state is explained as follows.

The step of determining the block strength St and a filtering state is a process for determining the H.26L system as standards, for which TML (test model long-term number 5) is in progress. In this case, the TML compresses a video by taking a 4×4 block as a reference.

The TML (test model long-term) moving picture compression system uses a technique of removing spatial and temporal redundancy information from an encoder so as to transmit spatially & temporally compressed information and additional information required for decoding. Of course, in order to remove the redundancy information on a temporal domain, MPEG (moving picture expert group) and H.263 motion compensation system according to the related art are used. The technique of removing the blocking using a basic mechanism of such a TML system is generally treated by 4×4 block unit.

In this case, H.263 and H.26L are moving picture compression standards proposed by ITU-T (international telecommunications union-telecommunication).

The system for removing the blocking according to an embodiment of the present invention may follow the system of the related art. Yet, the filtering state is determined by the following pre-treatment steps 1 to 3 since the degree of the blocking differs in accordance with a coded block pattern, a quantization step size, and a motion vector size.

[Step 1]
Strength St of each 4×4 block is initialized by '0' (St=0).
[Step 2]
If each of the 4×4 blocks is an intra-coded block or has a non-zero transform coefficient, St=max(St,2).

[Step 3]
If a motion vector difference between respective motion vectors for the two blocks block1 and block2 in FIG. 2(a) and FIG. 2(b) is equal to or greater than '1', St=Max(St, 1).

In this case, max(a,b) means a maximum value of 'a' and 'b'. Namely, max(a,b) is a function for selecting a greater value from 'a' and 'b'.

Moreover, after the strength St of each of the blocks has been determined, the loop filtering is carried out in accordance with the quantization size of each of the blocks.

For carrying out the loop filtering, the quantization sizes of the two blocks block1 and block2 are as follows.

First case is that the quantization value of the block block1 is smaller than '21' and the strengths of the two blocks block1 and block2 are not '0'. And, second case is that the quantization value of the block block1 is greater than '20' and the strength St of one of the two blocks block1 and block2 is not '0'.

In this case, the filtering state is determined differently in accordance with the quantization size because an adaptive treatment is performed due to the dominating generation of blocking in case of a great quantization size.

Therefore, when the conditions for the pre-treatment steps 1 to 3 are met, the loop filtering process is carried out by the following manner.

First, pixel locations of two blocks block1 and block2 are shown in FIG. 3. If the above-defined filtering state of each of the blocks is satisfied, values of pixels c, d, e, and f are found by the following Formula 2-1 (for calculating filter coefficient values to be used in Formula 2-5).

$$r1 = reg\{St_1, QP, abs(b-c)\},$$
$$r2 = reg\{St_1, QP, abs(c-d)\},$$
$$r3 = reg\{\max(St_1+1, St_2+1), QP, abs(d-e)\},$$
$$r4 = reg\{St_2, QP, abs(e-f)\},$$
$$r5 = reg\{St_2, QP, abs(f-g)\} \quad \text{[Formula 2-1]}$$

From Formula 2-1, reg(.) is defined by the following Formula 2-2.

$$reg(St, QP, Diff) = \frac{256 \times M(St) \times DQP(QP)}{Diff \times Diff + M(St) \times DQP(QP)}, \quad \text{[Formula 2-2]}$$

where Diff is a random value and 'abs' indicates a function of absolute value.

And, M(St) is defined by the following Formula 2-3.

$$M(St=0) = 1/6,$$
$$M(St=1) = 4/16,$$
$$M(St=2) = 8/16,$$
$$M(St=3) = 1 \quad \{\text{Formula 2-3}\}$$

And, DQP(QP) is explained by referring to FIG. 4 as follows.

FIG. 4 illustrates a table of LQP values for determining DQP(QP) values according to an embodiment of the present invention. Namely, DQP(QP) is defined by the following Formula 2-4, and can be found by substituting the LQP values shown in the table of FIG. 4. LQP is a quantization table defined in H.26L, and DQP defines a quantization error range in accordance with the quantization table defined in H.26L as defined by Formula 2-4. Namely, the LQP values are "620", "553", "429", . . . , "24", and "22" if the quantization variables QP are "0", "1", "2", ..., "30", and "31", respectively. Namely, as the quantization variable (0, 1, 2, ..., 30, 31) increases sequentially, the LQP value decreases with a pre-determined value (620, 553, 492, ..., 24, and 22).

$$DQP(QP) = \frac{676}{LQP(QP)} \quad \text{[Formula 2-4]}$$

Formula 1-11 is equivalent to Formula 2-2, and $QP^2$, $K_P$ (or $K_N$), and $\{g(i,j)-g(i,j-1)\}$ in Formula 1-11 are parameters equivalent to DQP(QP), M(St), and Diff in Formula 2-2, respectively.

Hence, the filtered values of the pixels c, d, e, and f are calculated by the following Formula 2-5 using the defined parameters.

$$c_{mod} = \{(512-r_1-r_2) \times c + r_1 \times b + r_2 \times d + 256\} >> 9$$

$$d_{mod} = \{(512-r_2-r_3) \times d + r_2 \times c + r_3 \times e + 256\} >> 9$$

$$e_{mod} = \{(512-r_3-r_4) \times c + r_3 \times e + r_4 \times f + 256\} >> 9$$

$$f_{mod} = \{(512-r_4-r_5) \times f + r_4 \times e + r_5 \times g + 256\} >> 9, \quad \text{[Formula 2-5]}$$

where ">>" means a bit shift, and $C_{mod}$, $d_{mod}$, $e_{mod}$, and $f_{mod}$ mean values of filtering c~f having the blocking shown in FIG. 3.

Meanwhile, the result from the above-explained processing brings about an effect of removing the blocking and ringing with satisfaction. Yet, micro blocking still exists in the boundary region of the macro block constituted by 16×16 block unit. In order to settle the micro blocking, an additional filtering, as shown in Formula 2-6, is carried out on the pixel lying at the boundary region of the macro block.

$$d_{mod} = (c_{mod} + 13 \times d_{mod} + 2 \times e_{mod} + 8) >> 4$$

$$e_{mod} = (2 \times d_{mod} + 13 \times e_{mod} + f_{mod} + 8) >> 4,$$

if QP>16 and d and e are macro block boundary pixels.

Accordingly, the present invention carries out a real-time processing of removing a blocking and a ringing phenomenon in accordance with a pixel location, a coded block pattern, a quantization step size, and a motion vector size in a digital video appliance using the H.26L moving picture compression technique, thereby enabling to improve a video quality of a compression image demanding a low bit rate or high-speed processing.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of removing a blocking phenomenon in a loop filtering system, comprising:
   determining whether at least one of a first block and a second block has non-zero transform coefficient information, the second block being adjacent to the first block,
   obtaining a motion vector difference between a motion vector for the first block and a motion vector for the second block,
   determining a filter strength value in consideration of at least one among a presence of the non-zero transform coefficient information and the obtained motion vector difference,
   obtaining a pixel value difference between at least two pixels on a block boundary between the first block and the second block, and
   calculating values of the at least two pixels based on the filter strength value and a function, the function including the obtained pixel value difference, and the function including performing a bit shift operation, wherein the bit shift operation uses an integer wherein the integer is greater than 1, and wherein the bit shift operation is performed after using the obtained pixel value difference.

2. A method of removing a blocking phenomenon in a loop filtering system, comprising:
   determining whether at least one of a first block and a second block has non-zero transform coefficient information, the second block being adjacent to the first block,
   obtaining a motion vector difference between a motion vector for the first block and a motion vector for the second block,
   determining a filter strength value in consideration of at least one among a presence of the non-zero transform coefficient information and the obtained motion vector difference,
   obtaining a pixel value difference between at least two pixels on a block boundary between the first block and the second block, and
   calculating values of the at least two pixels based on the filter strength value, the obtained pixel value difference and a mathematical function, the mathematical function including performing a bit shift operation, wherein the bit shift operation uses an integer wherein the integer is greater than 1, and wherein the bit shift operation is performed after using the obtained pixel value difference.

* * * * *